April 14, 1953

L. M. STINCHCOMB ET AL 2,634,786

METHOD OF MOUNTING SEPARABLE THIN
METAL NIPPLE HOSE COUPLINGS

Filed Dec. 13, 1947

L. M. Stinchcomb &
R. S. Doerr
INVENTORS

BY Roy A. Plant
ATTORNEY

Patented Apr. 14, 1953

2,634,786

UNITED STATES PATENT OFFICE 2,634,786

METHOD OF MOUNTING SEPARABLE THIN METAL NIPPLE HOSE COUPLINGS

Loid M. Stinchcomb and Raymond S. Doerr, Battle Creek, Mich., assignors to H. B. Sherman Manufacturing Company, Battle Creek, Mich., a corporation of Michigan Application December 13, 1947, Serial No. 791,482

1 Claim. (Cl. 153—1)

The present invention relates broadly to connecting devices, and in its specific phases to the forming and anchoring of separable couplings on hose sections.

Hose couplings of the conventional threadedly separable type have male and female halves, the male half having a cylindrical nipple with one end enlarged and externally threaded, while the female half has an outwardly flanged end cylindrical nipple, the flange of which is engaged by the inturned end flange of a nut which is internally threaded to fit the threads on the male half of the coupling. The nipple portion of each half of the coupling is commonly circumferentially ribbed with one or more ribs for a short distance from its hose receiving end to facilitate fastening a hose on same with a hose clamp or ferrule. To install each half of this coupling on a piece of hose, the common practice is to slip one half of the coupling onto an extending shouldered mandrel which passes into the coupling member from its large end with the shoulder of the mandrel against the nipple shoulder, or flange, inside the end of the coupling. The ribbed coupling is then bodily forced into the end of the hose until the hose comes up against the enlarged end of the coupling half. A hose clamp, or ferrule, of conventional type is then tightened on the hose over the nipple end of the coupling to anchor them together. This procedure, aside from the force required to push the enlarged nipple into the hose, is very satisfactory with the male half of the coupling, but causes trouble with the female half for the reason that when the hose is forced up against the inturned end flange of the nut it frictionally holds same against free rotation and makes the tightening of same on a sill cock, male coupling member, or the like, difficult without also twisting the hose, a thing which should not be necessary. The tightening of a hose clamp, or ferrule, on the ribbed nipple assembly to anchor the hose on the female half of the coupling further aggravates this condition since the tightening of the hose clamp, or ferrule, causes some endwise displacement of the hose which makes the end of the hose bind still tighter against the end flange of the nut.

According to present day practice in the production of separable garden hose couplings, and the like, they are formed from suitable thin metal cylindrical tube stock, or drawn from sheet metal, rather than made as castings, a thing which is no longer economically feasible. The thin metal is shaped so as to have an enlarged externally threaded portion with an extending cylindrical nipple which has one or more circumferential ribs on the hose receiving end to form the male half of the coupling ready for mounting on a hose section. In connection with the female half of the coupling, the thin metal cylindrical nipple is commonly formed with an outwardly flanged end, the finished nut with its inturned end flange slipped into place, and one or more hose gripping corrugations formed on the hose receiving end of the nipple to complete the assembly, or the nipple may be completed first with its end flange and hose gripping corrugations, and a partially finished nut slipped in place and the inturning of its flange then completed. Both of these constructions are subject, under conditions of use, to the same trouble described above relative to the hose binding on the nut.

Instead of initially circumferentially ribbing the hose receiving end of the nipple of each half of the coupling, which makes it harder to install the coupling on the hose section due to the enlargement of the nipple and the extra insertion pressure and special tools required, we propose to leave the nipples plain and of substantially the same outside diameter as the inside diameter of the hose section on which the nipples are to be mounted. This in turn makes it easy to insert the coupling nipple, without the use of a mandrel, into the end of a piece of hose carrying a plain ferrule, following which the nipple may have circumferential ribs formed in an outward direction, entirely within the length of the ferrule, to anchor the coupling in place in accordance with the present invention.

Where plain unribbed nipple type separable couplings are to be shipped in separate halves to a hose manufacturer for installation, the difficulty of the female coupling halves coming apart in shipment and handling is involved, and if these female halves are shipped disassembled, then time is required to assemble them before installation. A specific way of overcoming this difficulty is to form a rib on the female nipple spaced sufficiently from its flange to permit the flange of the nut to freely fit therebetween, and thus anchor the two together. This feature, which forms part of the combination of the present composite invention, is the specific subject matter of our copending patent application Serial No. 783,015, filed October 30, 1947, now Patent No. 2,460,110. It was a recognition of the above problems and difficulties, and the shortcomings of the prior art in the thin metal separable hose coupling field, combined with the desire to improve same, which led to the conception and development of the present invention.

Accordingly among the objects of the present invention is the provision of a separable hose coupling having thin metal cylindrical nipples, each of which is adapted to be fastened to the end of a piece of hose, which has a suitable size ferrule mounted thereon, by inserting the nipple into the end of the ferrule carrying hose and expanding ribs in same entirely within the length of the ferrule to grip said hose between said ferrule and nipple, thus producing a full flow construction.

Another object is to provide the female half of a thin metal separable hose coupling with an outwardly extending rib and flange at one end of the nipple, said rib and flange being spaced apart sufficiently to receive and permit free movement of the inturned flange of the nut portion thereof without interfering with the subsequent expansion of the hose receiving end of the nipple after mounting on a piece of hose.

Another object is to provide a hose with a thin metal separable coupling mounted thereon, said coupling having male and female halves, both of which have extending nipples which are expanded to form ribs entirely within the length of the ferrule on the end of the hose, and adapted to grip the hose to said ferrule, the female half of the coupling carrying a nut with inturned flange at one end engaged for free movement between an outwardly extending spaced apart rib and flange on one end of the nipple.

A further object is to provide a new method of forming and mounting a thin metal separable hose coupling on a piece of hose by expanding each nipple with the hose and ferrule in place thereon, coupled with the placing of an outwardly extending rib on the female nipple adjacent but spaced from the end flange thereof to anchor the nut thereon and facilitate free rotary movement of the nut on the nipple after final assembly on the hose.

A further object is to provide a thin metal separable hose coupling which is simple in construction, efficient in operation, easy to manufacture, and easy to insert in the end of a suitable size piece of hose as well as to anchor thereto.

Still further objects and advantages of the present invention will appear as the description proceeds.

To the accomplishment of the foregoing and related ends, the invention, then, consists of the steps hereinafter fully described and particularly pointed out in the claims, the annexed drawing and the following description setting forth in detail several modes of carrying out the invention, such disclosed modes illustrating, however, but several of various ways in which the principle of the invention may be used.

Figure 1:
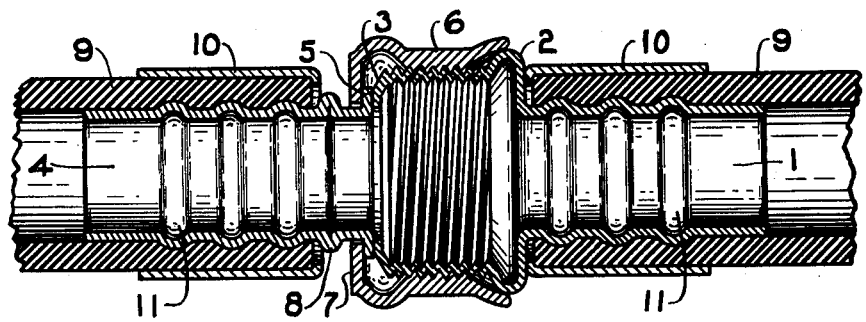
Figure 1 shows a longitudinal section view of a separable thin metal coupling mounted on hose sections in accordance with the present invention.

Referring more particularly to Figure 1 of the drawing, it will be noted that the right hand or male half of the coupling has an extending cylindrical nipple 1 which is provided with an enlargement 2 at one end, such enlargement being externally threaded and provided with an inturned flange 3 at its end opposite the nipple portion. The left hand or female half of the coupling is provided with an extending cylindrical nipple 4 which has a flange 5 at one end. Mounted on nipple 4 is an internally threaded nut 6, one end of which is provided with an inturned flange 7 adapted to engage nipple 4 behind flange 5 as shown. A rubber washer is normally used within the coupling between flange 5 of nipple 4 and flange 3 of the male half of the coupling, such washer, however, has not been shown since it does not form part of the present invention.

Figure 2:
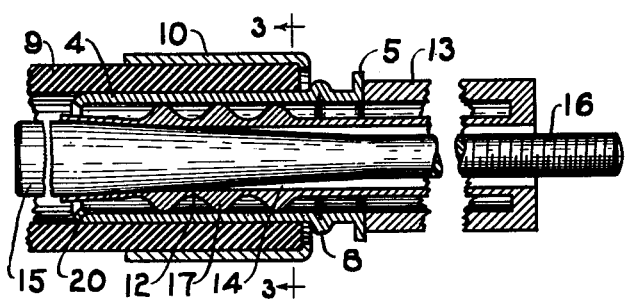
Figure 2 shows in diagrammatic manner a partially sectioned view of one convenient way of forming the outwardly expanded ribs in the straight inside bore of the thin metal cylindrical nipple entirely within the length of the ferrule, the nut having been omitted for clarity of illustration.
Figure 3:
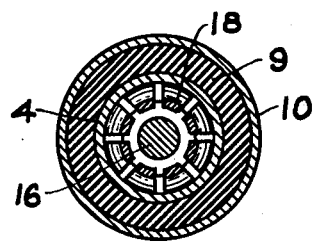
Figure 3 shows a sectional view as taken at line 3—3 of Figure 2, looking in the direction of the arrows.

In accordance with the present invention, nipples 1 and 4 are produced in cylindrical unribbed form such as is shown, for instance, in Figure 2 relative to nipple 4. This separable hose coupling is designed specifically for easy insertion in the end of a piece of hose, and ribbing after insertion therein. Accordingly, to save time, the male and female halves are preferably shipped disassembled to the point of installation. Where the female half of the nipple is assembled and shipped in this manner, the difficulty encountered is that nut 6 will sometimes come off of nipple 4 either in transit or during handling, and if the nut and nipple are shipped separately then there is the extra time involved of assembling them at the time of installation. To overcome this situation, we propose to form a rib 8 on nipple 4 of the female half sufficiently spaced from flange 5 thereof, for example $\frac{1}{16}$ to $\frac{1}{8}$ inch, to permit flange 7 of nut 6 to be freely movable in the groove between said rib 8 and flange 5, the latter preferably being formed after mounting nut 6 on the end of nipple 4. This not only prevents accidental separation of nipple 4 and nut 6, but also overcomes a fundamental difficulty which has been encountered in the past, since by forcing the hose receiving end of the nipple of our improved female half of the coupling into the end of the hose by pushing against the outer end of nut 6, the inturned flange 7 of that nut will move up against rib 8 so that when hose section 9 comes up against rib 8 or flange 7 of nut 6 this is as far as the hose is moved onto the nipple and at the same time nut 6 will not have its inturned flange 7 bound against the end of hose 9, but rather same will be free to rotate in the groove between flange 5 and rib 8. It should be noted, however, that before the end of the hose section 9 is forced onto the smooth end of nipple 4, a ferrule 10 will be first placed on the end of the hose as shown.

To make it still easier to push the smooth nipples into the ends of the hose, the entering end is preferably rounded or chamfered slightly, or even turned in a little to form a small rounded flange 20, Figure 2. This flange 20 is straightened by expansion member 12, when ribs 11 are formed, so that when the expansion is completed the nipples of the male and female halves of the coupling will appear substantially as shown in Figure 1.

Figure 4:
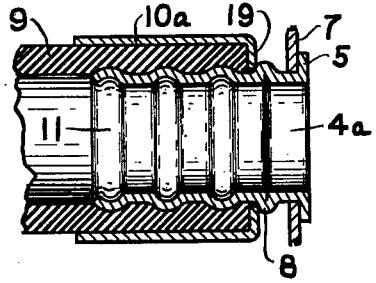
Figure 4 shows a fragmentary section view of a modification of the Figure 1 assembly, wherein the tail of the nipple does not extend beyond the end of the ferrule.

Rib 8 on nipple 4 of the female half of the coupling may be formed by rolling, upsetting, or the like, before installation of the female half of the coupling onto the hose. It is to be understood that the showing of rib 8 in Figures 1, 2, and 4 is diagrammatic of same after having been produced by these various equivalent procedures.

A situation similar to the mounting of the female half of the coupling is involved where hose 9, with ferrule 10 mounted thereon, is forced onto nipple 1 of the male half of the coupling, by pushing with the large end of the male half against the edge of the assembly bench, or the like, which thus places this half of the coupling in position for anchoring on the end of the hose section.

With ferrule 10 and hose 9 mounted on nipple 4 of the female half of the coupling as shown in Figure 2, by pushing the nut end of the latter against the edge of the assembly bench, or the like, the next step is to externally expand ribs 11 in nipple 4. One convenient way of expanding these ribs is to utilize an expansion member 12 which is externally ribbed and provided with multiple lengthwise slots which extend from the ribbed end almost to the opposite end. This expansion member 12 is adapted to freely pass into nipple 4 until its flange 13 comes up against flange 5 of nipple 4, and is so proportioned that when same is mounted as shown, the circumferential ribs 17 on the expansion member will be in proper location for the production of ribs 11 in nipple 4 entirely within the length of ferrule 10. This expansion member 12 preferably has a straight bore 14 throughout its length, and fitting the bore of expansion member 12, is an expansion mandrel member 15 which gently curves outward, preferably in the form of an ogee curve, to full ribbing size, and then extends full size to its end, this shape being very efficient for expansion use. For convenience, this mandrel member may be threaded on its extending end 16 to facilitate connection to a suitable source of operating power. With the expansion member and mandrel in place as shown in Figure 2, mandrel member 15 is pulled to the right while expansion member 12 is held, in any convenient manner, against endwise movement out of nipple 4. The movement of mandrel 15 thus forces segments 18 of the expansion member 12 outward to progressively form the ribs which are shown in Figure 1, and at the same time straightens out flange 20 on the end of the nipple when present as shown in Figure 2. This procedure requires less power to operate at any one time since the first rib is partially formed before the second is started, and the first is finished before the second, et cetera. The forming of the first rib 11, which would be the one within and adjacent the unflanged end of ferrule 10, pockets the portion of the hose between that rib and the flanged end of the ferrule, and then the progressive forming of the succeeding ribs exerts progressively greater gripping pressure to lock the coupling onto the end of the hose. This procedure not only permits the application of extreme gripping pressure on the hose with reduced power input due to forming the ribs progressively, but also allows the expansion stresses and strains in the metal to be moderately self relieved in manner not possible if all of the ribs were formed simultaneously. The male half of the hose coupling is assembled in like manner to the female half and the ribs 11 formed in place as shown. After the ribs 11 have been formed in the nipple, the mandrel member 15 is moved to the left which permits the expanding member 12 to contract to its initial size following which mandrel member 15 and expansion member 12 may be removed from the hose mounted coupling for use in the next coupling half to be expanded. The coupling, as thus mounted, is free from a hump or humps beyond the end of the ferrule and is substantially smooth and very neat in appearance. Hydraulic pressure tests with this type of construction show that when the ribs are properly expanded, and entirely within ferrule 10, which can be easily observed by skilled workmen due to the slight bulge which appears in the ferrule between its ends during the rib forming step, the coupling is rigidly anchored in place on the hose to the extent that a piece of standard hose will normally burst before it will separate from the coupling, thus showing that there is nothing to be gained by ribbing beyond the end of ferrule 10, and which might weaken the hose fabric.

While the nipple within the hose may be longer than ferrule 10 mounted thereon, as is typically shown in Figures 1 and 2, and which gives added internal support to the hose and reduced breakage of same at the coupling under conditions of use, it may be of the same length or even a little shorter than the ferrule. The latter is typically illustrated in Figure 4 relative to the female half of the coupling where nipple 4a is shown slightly shorter than ferrule 10a, and yet is expandable with the same tool as is diagrammatically shown in Figure 2 relative to the longer type of nipple. Ferrule 10a, which is interchangeable with ferrule 10, is provided with an end flange 19 which extends inward substantially to the outer surface of nipple 4a. With this type of construction, the formation of the expanded ribs 11 acts to lock the ferrule in place, with the hose gripped therein, since the opening through flange 19 is smaller than the outer diameter of ribs 11. The expansion principle applies equally with the nipple of either the male or female half of the coupling, and accordingly it is intended that the showing in Figure 4 be considered as diagrammatically illustrating the expanded nipple of either half of the coupling.

Other modes of applying the principle of our invention may be employed instead of those explained, change being made as regards the method herein disclosed, provided the step or steps stated by any of the following claims or the equivalent of such stated step or steps be employed.

We therefore particularly point out and distinctly claim as our invention:

The method of fixedly mounting a nipple ended thin metal type of separable hose coupling, one half at a time, on the end of a section of hose in which it is inserted and which has a close fitting ferrule on the outer face of same, said ferrule being substantially shorter than the nipple portion which extends from the separable end of the coupling half and separated from said coupling half, said nipple forming a part of the coupling half and being expansible and of substantially straight tubular form approximately of the same outside diameter as the inside diameter of the hose section on which said coupling half is to be fixedly mounted and having a smooth outer surface, except for the very end of the nipple which is moderately inwardly directed for ease of insertion into the end of the hose, the female half of said separable coupling having a rib behind the nut to hold same in place and also facilitate mounting the coupling half on the hose as well as provide freedom of the nut to rotate, which comprises the steps of first expanding the end portion of said nipple extending beyond the end of said ferrule to substantially straighten said turned in end of the nipple, said portion when fully expanded being of substantially straight cylindrical form which grips the hose to the end of the ferrule, and progressively expanding said nipple by distortion of the smooth outer face from said expanded cylindrical portion toward the nut carrying end of said coupling half by starting the formation of a circumferential rib under said ferrule, and before said rib is completed, starting the formation of a second circumferential rib, said first rib being completed before the second, and thus continuing the expansion down said nipple toward, and terminating just short of, said rib behind the nut to firmly grip the hose to said ferrule substantially the full length of same, and thus complete the anchoring of the female half of the coupling to the section of hose.

LOID M. STINCHCOMB.
RAYMOND S. DOERR.

References Cited in the file of this patent

UNITED STATES PATENTS

| Number | Name | Date |
|---|---|---|
| 6,360 | Prosser | Apr. 17, 1849 |
| 417,323 | John | Dec. 17, 1889 |
| 946,703 | Nelson | Jan. 18, 1910 |
| 1,197,858 | Redmon | Sept. 12, 1916 |
| 1,296,222 | Russ | Mar. 4, 1919 |
| 1,753,005 | Grady | Apr. 1, 1930 |
| 2,228,018 | Scholtes | Jan. 7, 1941 |
| 2,338,666 | Nelson | Jan. 4, 1944 |
| 2,423,458 | Martin | July 8, 1947 |
| 2,444,601 | Hansen | July 6, 1948 |